(12) United States Patent
Chen et al.

(10) Patent No.: US 10,770,696 B2
(45) Date of Patent: Sep. 8, 2020

(54) TOP COVER ASSEMBLY OF SECONDARY BATTERY AND SECONDARY BATTERY

(71) Applicant: CONTEMPORARY AMPEREX TECHNOLOGY CO., LIMITED, Ningde (CN)

(72) Inventors: Baisong Chen, Ningde (CN); Peng Wang, Ningde (CN); Kai Wu, Ningde (CN); Zhiyu Wang, Ningde (CN); Xiaobo Chen, Ningde (CN); Taosheng Zhu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 272 days.

(21) Appl. No.: 15/950,617

(22) Filed: Apr. 11, 2018

(65) Prior Publication Data

US 2019/0027717 A1 Jan. 24, 2019

(30) Foreign Application Priority Data

Jul. 20, 2017 (CN) .......................... 2017 1 0599686

(51) Int. Cl.
*H01M 2/04* (2006.01)
*H01M 2/30* (2006.01)
*H01M 2/34* (2006.01)

(52) U.S. Cl.
CPC ....... *H01M 2/0486* (2013.01); *H01M 2/0473* (2013.01); *H01M 2/30* (2013.01); *H01M 2/345* (2013.01); *H01M 2/348* (2013.01); *H01M 2200/103* (2013.01); *H01M 2200/20* (2013.01)

(58) Field of Classification Search
CPC .... H01M 2/0486; H01M 2/0473; H01M 2/30; H01M 2/345; H01M 2/348; H01M 2200/103; H01M 2200/20; H01M 2/0404; H01M 2/043; H01M 2/20
See application file for complete search history.

(56) References Cited

U.S. PATENT DOCUMENTS

| 2012/0141845 A1* | 6/2012 | Byun ................... | H01M 2/043 429/61 |
| 2015/0303439 A1* | 10/2015 | Bae ................... | H01M 10/0413 429/61 |
| 2016/0293907 A1* | 10/2016 | Chen ................... | H01M 2/1094 |

(Continued)

*Primary Examiner* — Muhammad S Siddiquee
(74) *Attorney, Agent, or Firm* — Tucker Ellis LLP (57) ABSTRACT

Provided are a top cover assembly and a secondary battery containing the same. The top cover assembly includes a first electrode terminal, a conduction member, a second electrode terminal, and a top cover plate insulated from the first electrode terminal and electrically connected to the second electrode terminal, the secondary battery further comprises a contact plate which is attached to the top cover plate, the conduction member is insulated from the top cover plate and comprises an electrode terminal connection portion, a first fuse member, a contact plate connection portion, and a connection layer, the first fuse member has a melting point lower than the electrode terminal connection portion and the contact plate connection portion; the first fuse member is connected to the electrode terminal connection portion via the connection layer, and/or the first fuse member is connected to the contact plate connection portion via the connection layer.

17 Claims, 4 Drawing Sheets

(56) References Cited

U.S. PATENT DOCUMENTS

| | | | |
|---|---|---|---|
| 2016/0322539 A1* | 11/2016 | Zhang | H01L 33/486 |
| 2017/0250394 A1* | 8/2017 | Wakimoto | H01M 2/345 |
| 2018/0233716 A1* | 8/2018 | Chen | H01M 2/0404 |
| 2019/0237728 A1* | 8/2019 | Wakimoto | H01M 2/0473 |
| 2020/0058919 A1* | 2/2020 | Kim | H01M 2/345 |

* cited by examiner

TOP COVER ASSEMBLY OF SECONDARY BATTERY AND SECONDARY BATTERY

CROSS-REFERENCE TO RELATED APPLICATIONS

The present application claims priority to Chinese Patent Application No. 201710599686.4, filed on Jul. 20, 2017, the content of which is incorporated herein by reference in its entirety.

TECHNICAL FIELD

The present application relates to the technical field of energy storage devices and, particularly, relates to a top cover assembly of a secondary battery and a secondary battery.

BACKGROUND

Power batteries (e.g., lithium-ion batteries), due to advantages of high energy density, high power density, long cycling life, long storage time, etc., are widely used in portable electronic devices such as mobile phones, digital video cameras and portable computers, and also have a wide application prospect in electric transportation vehicles such as electric vehicles, electric bicycles and so on, and large-and-medium-sized electric equipment such as energy storage facilities and so on. The power batteries have become a key to solving global problems such as energy crisis and environmental pollution.

When the power battery is overcharged, decomposition of an electrolyte solution in the power battery causes an internal pressure of the power battery to increase, causing fire and explosion to the battery. In order to prevent the fire and explosion caused by an increase of the internal pressure, an external short-circuit unit is generally used and a fuse is placed between a positive electrode and a positive electrode terminal. When the internal pressure of the power battery is increased, the positive electrode and the negative electrode of an electrode assembly are electrically connected into a short circuit by the external short-circuit unit to form a large current which fuses the fuse between the positive electrode and the positive electrode terminal, thereby terminating the charging of the electrode assembly.

However, the above structure reduces tolerance of the power battery against high temperature environment. For example, the above structure greatly increases the probability of thermal runaway of the power battery in a hot-box test. The specific reasons are described as follows. In the high temperature environment, not only the internal pressure of the power battery increases with the decomposition of the electrolyte solution at a high temperature, but also an internal resistance of the electrode assembly increases. In this case, if the positive electrode and the negative electrode of the power battery are electrically connected into a short circuit by the external short-circuit unit, the electrode assembly generates more heat due to the increase of the internal resistance and the short-circuit current, which increases the risk of fire and explosion of the power battery. In other words, the existing external short-circuit unit can only solve the overcharge problem of the power battery under normal temperature conditions, but increases the probability of thermal runaway under a high temperature environment.

In order to reduce the probability of thermal runaway of a secondary battery, the secondary battery in the related art further includes a fuse member made of a low-melting-point alloy, and the fuse member is connected to a negative conduction member to ensure the fuse portion can be melted to cut off the short circuit during the hot-box test. However, when the connection strength between the fuse member and the negative conduction member is low, the contact resistance between the fuse member and the negative conduction member is relatively great, causing the fuse member to fuse when the fuse portion is overcharged to form a short circuit at normal temperature. As a result, even the overcharge problem of the power battery under normal temperature conditions cannot be solved, reducing the safety of the secondary battery.

SUMMARY

The present application provides a top cover assembly of a secondary battery and a secondary battery, which can improve safety performance of the secondary battery.

The first aspect of the present application provides a top cover assembly of a secondary battery, including: a first electrode terminal, a conduction member, a second electrode terminal, and a top cover plate, wherein the top cover plate is insulated from the first electrode terminal, and the top cover plate is electrically connected to the second electrode terminal, wherein the secondary battery further includes a contact plate, and the contact plate is attached to the top cover plate, and the conduction member is insulated from the top cover plate, wherein the conduction member includes an electrode terminal connection portion, a first fuse member, and a contact plate connection portion, wherein a melting point of the first fuse member is lower than a melting point of the electrode terminal connection portion and a melting point of the contact plate connection portion, wherein the contact plate is configured to deform under an internal pressure of the secondary battery and to be electrically connected to the contact plate connection portion when the internal pressure of the secondary battery exceeds a reference pressure, for forming an electric connection path passing through the first electrode terminal and the second electrode terminal, and wherein the conduction member further includes a connection layer, wherein the first fuse member is connected to the electrode terminal connection portion via the connection layer, and/or the first fuse member is connected to the contact plate connection portion via the connection layer.

In an embodiment, the electrode terminal connection portion and/or the contact plate connection portion is made of a first metal material, the first fuse member is made of a second metal material, and the connection layer is made of a third metal material, wherein a bonding force formed between the third metal material and the first metal material and a bonding force formed between the third metal material and the second metal material are both greater than a bonding force formed between the first metal material and the second metal material.

In an embodiment, the third metal material is nickel, nickel alloy, tin, tin alloy, bismuth, or bismuth alloy, the first metal material is aluminum or aluminum alloy, the second metal material is a metal including one or more elements selected from a group consisting of bismuth, tin, lead, zinc, and indium.

In an embodiment, a number of the connection layer is two, wherein one of the two connection layers is connected to the electrode terminal connection portion, the other one of the two connection layers is connected to the first fuse member, and the two connection layers are welded to each other.

In an embodiment, the top cover assembly further includes an insulation member, wherein the conduction member is insulated from the top cover plate by the insulation member, and wherein a first through hole is defined in the insulation member, and the contact plate deformed contacts the contact plate connection portion through the first through hole.

In an embodiment, the insulation member includes a first portion and a second portion connected to the first portion, wherein the first portion is fixed between the electrode terminal connection portion and the top cover plate, and the second portion surrounds the contact plate connection portion, wherein the first through hole is defined in the second portion.

In an embodiment, the top cover assembly further includes a thermo-expandable portion made of an insulative and thermally expandable material, wherein the first fuse member and the thermo-expandable portion are arranged along a thickness direction of the conduction member, the thermo-expandable portion is located above the first fusing portion, and the thermo-expandable portion is respectively laminated to the electrode terminal connection portion and the contact plate connection portion.

In an embodiment, the top cover assembly further includes an insulation member, wherein the conduction member is insulated from the top cover plate via the insulation member, and the insulation member and the thermo-expandable portion are formed as an integral structure.

A second aspect of the present application provides a secondary battery. The secondary battery includes the top cover assembly in any of the embodiments as described above, a housing, and an electrode assembly, wherein the top cover assembly is connected to an opening of the housing and forms a packaging space, wherein the electrode assembly includes a first electrode, a second electrode, and a separator interposed between the first electrode and the second electrode, wherein the first electrode terminal is electrically connected to the first electrode, and the second electrode terminal is electrically connected to the second electrode; and wherein the electrode assembly is packaged in the packaging space.

In an embodiment, the secondary battery further includes a second fuse member, and the first electrode terminal is electrically connected to the first electrode via the second fuse member, and/or the secondary battery further includes a third fuse member, and the second electrode terminal is electrically connected to the second electrode via the third fuse member.

The solutions provided by the present application at least have the following beneficial effects:

The top cover assembly of a secondary battery provided in the present application includes a conduction member, and the conduction member includes an electrode terminal connection portion, a first fuse member, and a contact plate connection portion. The first fuse member has a melting point lower than the electrode terminal connection portion and the contact plate connection portion. In order to prevent the risk of virtual connection between the first fuse member and the electrode terminal connection portion and between the first fuse member and the contact plate connection portion, the conduction member further includes a connection layer which may be provided on at least one of the electrode terminal connection portion and the contact plate connection portion. The first fuse member 12b can be connected to the electrode terminal connection portion via the connection layer, or be connected to the contact plate connection portion via the connection layer. Or a connection layer is respectively arranged on the electrode terminal connection portion and the contact plate connection portion, and the first fuse member is respectively connected to the electrode terminal connection portion 12a and the contact plate connection portion via the connection layer. The connection layer serves to increase the connection strength of the first fuse member with the electrode terminal connection portion and the contact plate connection portion. On the one hand, in the hot-box test, a current can be reliably transmitted among the electrode terminal connection portion, the first fuse portion, and the contact plate connection portion. When the temperature increases due to the heat generated the current and reaches a value at which the first fuse member fuses, the first fuse portion reliably fuses. On the other hand, under normal temperature conditions, when the secondary battery is in an overcharged state, the contact plate deforms under an effect of the internal pressure to be electrically connected to the contact plate connecting portion. The arrangement of the connection layer can reduce the contact resistance between the first fuse member and the electrode terminal connection portion and between the first fuse member and the contact plate connection portion, so that the first fuse member will not fuse because of heat generated due to an excessive resistance, thereby improving the safety of the secondary battery.

It should be understood that the above general description and the following detailed description are merely exemplary and are not intended to limit the present application.

REFERENCE SIGNS

1—top cover assembly;
  11—first electrode terminal;
    11a—riveting portion;
    11b—flange portion;
  12—conduction member;
    12a—electrode terminal connection portion;
    12b—first fuse member;
    12c—contact plate connection portion;
  13—second electrode terminal;
  14—top cover plate;
    141—hole;
  15—second electrode terminal conduction member;
  16—resistor;
2—electrode assembly;
3—housing;
4—insulation member;
  41—first portion;
  42—second portion;
    421—through hole;
5—sealing member;
6—contact plate;
  61—edge portion;
  62—deformable portion;
  63—central portion;

7—thermo-expandable portion;
101—second fuse member;
102—third fuse member;
104—first insulation member;
  104a—air hole;
105—second insulation member;
106—explosion-proof valve;
107—protection patch for explosion-proof valve;
108—liquid injection hole.

The accompanying drawings herein are incorporated into the specification and constitute a part of the specification, which show embodiments suitable for the present application, and are used to explain the principle of the present application together with the specification.

DESCRIPTION OF EMBODIMENTS

The present application will be further described in detail through specific embodiment in combination with the appended drawings.

Figure 1:
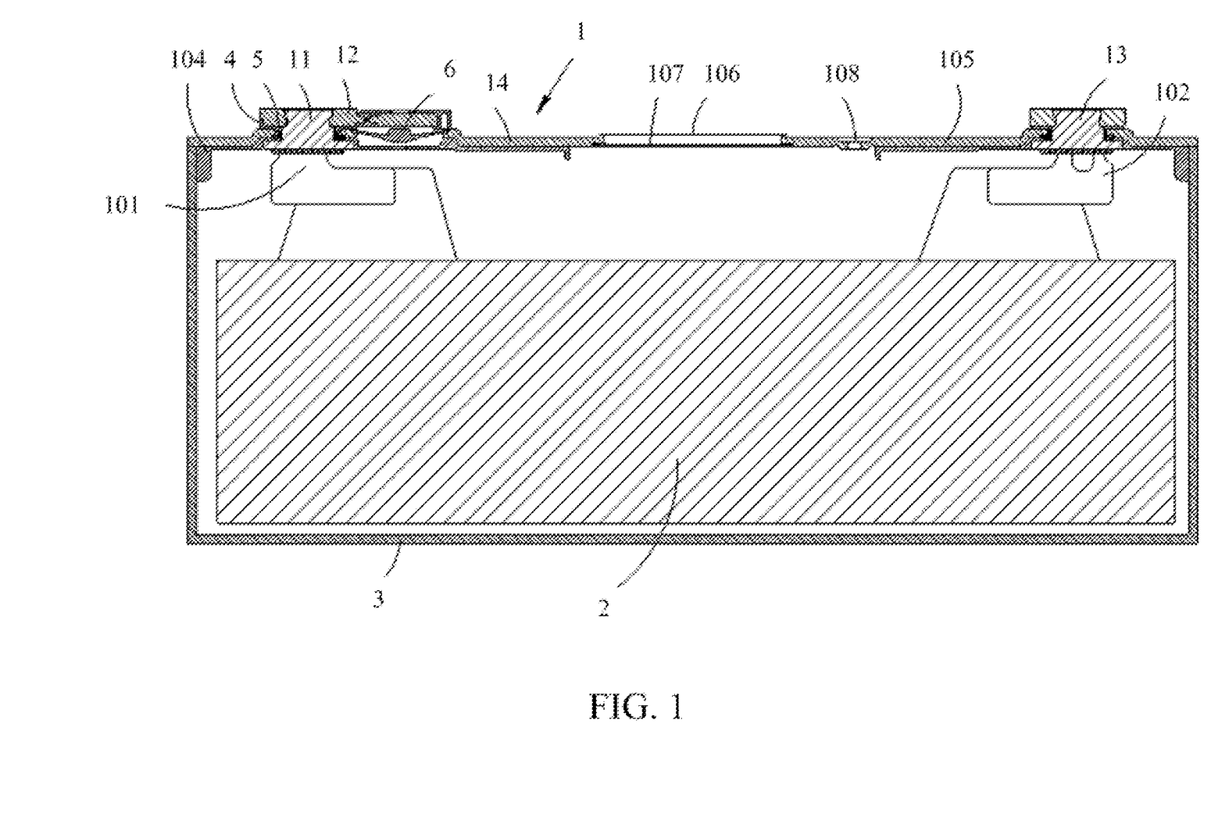
FIG. 1 is a cross-sectional view of a secondary battery provided in an embodiment of the present application.

As shown in FIG. 1, the present application provides a top cover assembly 1 of a secondary battery. The top cover assembly 1 includes a first electrode terminal 11, a conduction member 12, a second electrode terminal 13, and a top cover plate 14. The first electrode terminal 11 and the second electrode terminal 13 are used for electrical connection to the electrode assembly 2, and are installed to extend beyond the top cover plate 14, so that the electrode assembly 2 can be electrically connected to a component outside of a housing 3, thereby outputting electric energy in the electrode assembly 2. The polarity of the first electrode terminal 11 and the polarity of the second electrode terminal 13 are not limited in the present application. When the first electrode terminal 11 is a positive electrode terminal, the second electrode terminal 13 is a negative electrode terminal, and vice versa.

Figure 2:
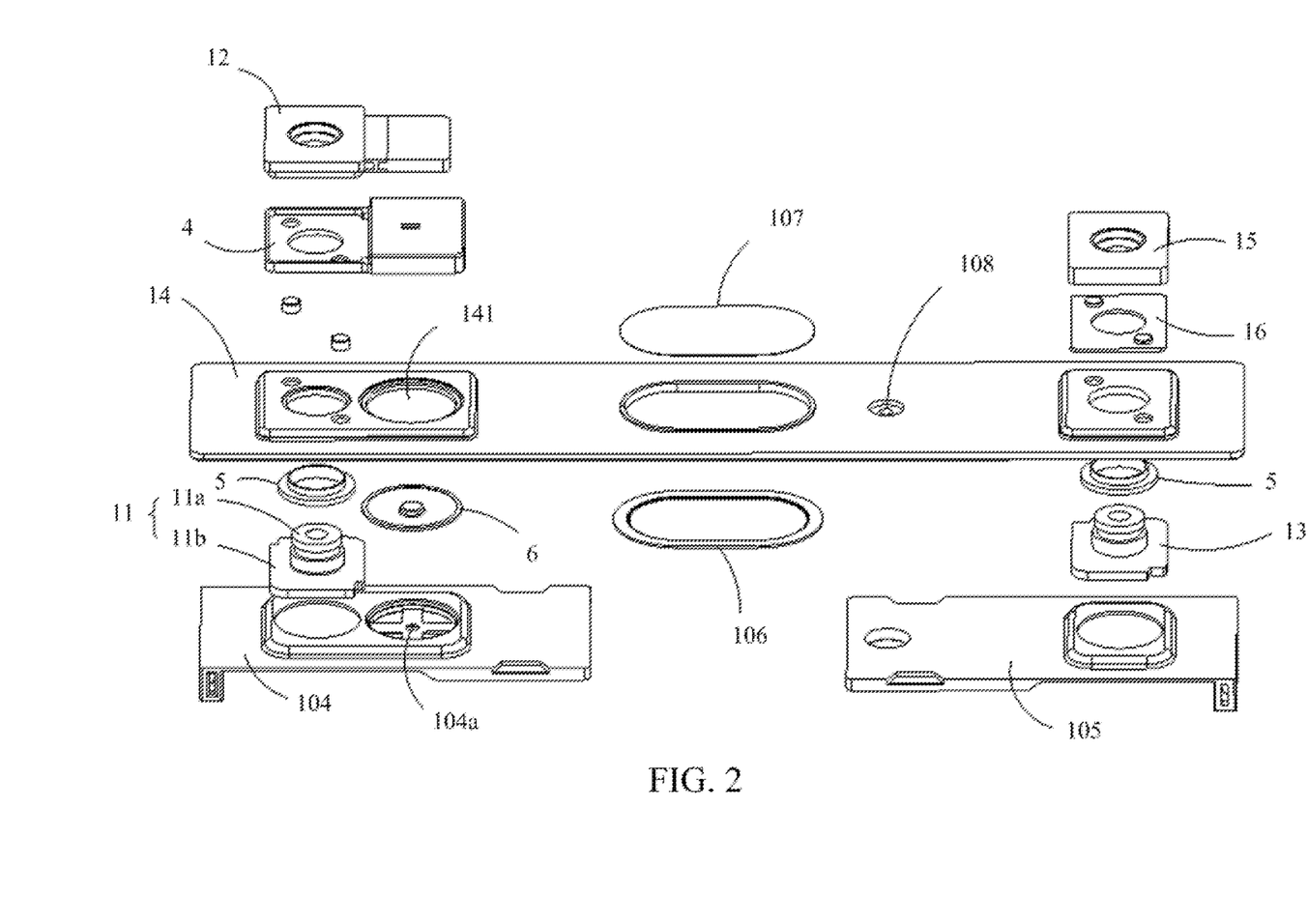
FIG. 2 is an exploded view of a top cover assembly of a secondary battery provided in an embodiment of the present application.

As shown in FIG. 2, each of the first electrode terminal 11 and the second electrode terminal 13 includes a riveting portion 11a and a flange portion 11b. When the top cover assembly 1 and the housing 3 are assembled together, the flange portion 11b is located inside of the housing 3, the riveting portion 11a is located outside of the housing 3, and the conduction member 12 is riveted to the riveting portion 11a, so that the conduction member 12 is supported at a first side (for example, an external side) of the top cover plate 14 from an exterior of the housing 3, the flange portion 11b is supported at a second side (for example, an internal side) of the top cover plate 14 from the interior of the housing 3, and the first side and the second side are opposite to each other. As such, the first electrode terminal 11 and the second electrode terminal 13 are fixed to the top cover plate 14.

It should be noted that the manner of connection between the conduction member 12 and the first electrode terminal 11 is not limited to riveting. For example, the riveting portion 11a may be replaced by a screw, and the conduction member 12 and the first electrode terminal 11 are in thread connection. Or, the conduction member 12 may be welded to the first electrode terminal 11.

The conduction member 12 includes an electrode terminal connection portion 12a, a first fuse member 12b, and a contact plate connection portion 12c. The electrode terminal connection portion 12a is riveted to the riveting portion 11a, the first fuse member 12b and the contact plate connection portion 12c are suspended, and the first fuse member 12b and the contact plate connection portion 12c are placed on a side of the electrode terminal connection portion 12a close to the second electrode terminal 13.

Figure 3:
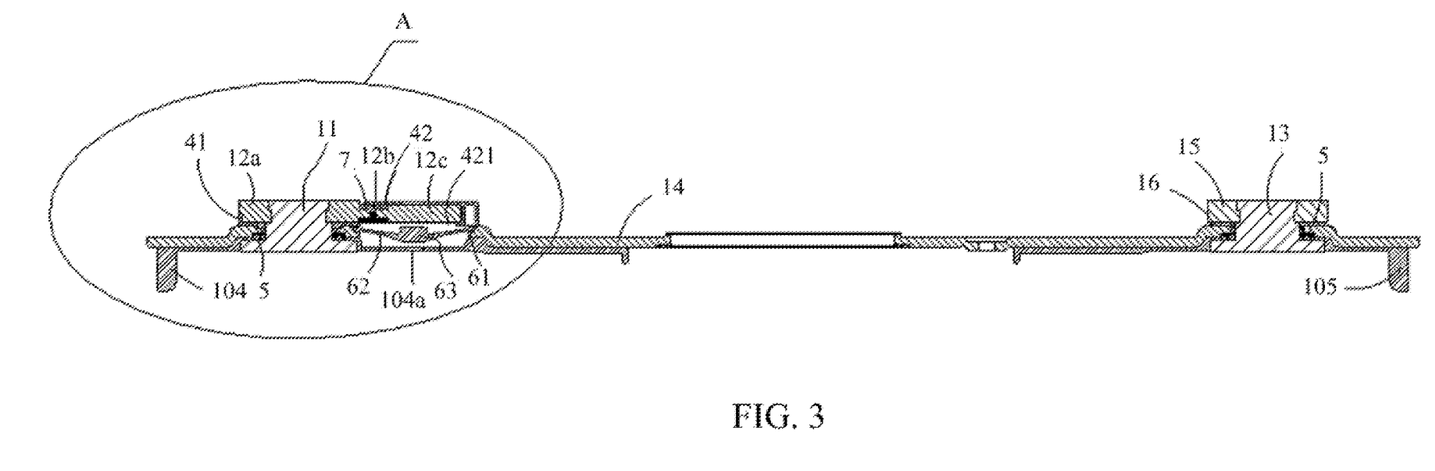
FIG. 3 is a cross-sectional view of a top cover assembly of a secondary battery provided in an embodiment of the present application.
Figure 4:
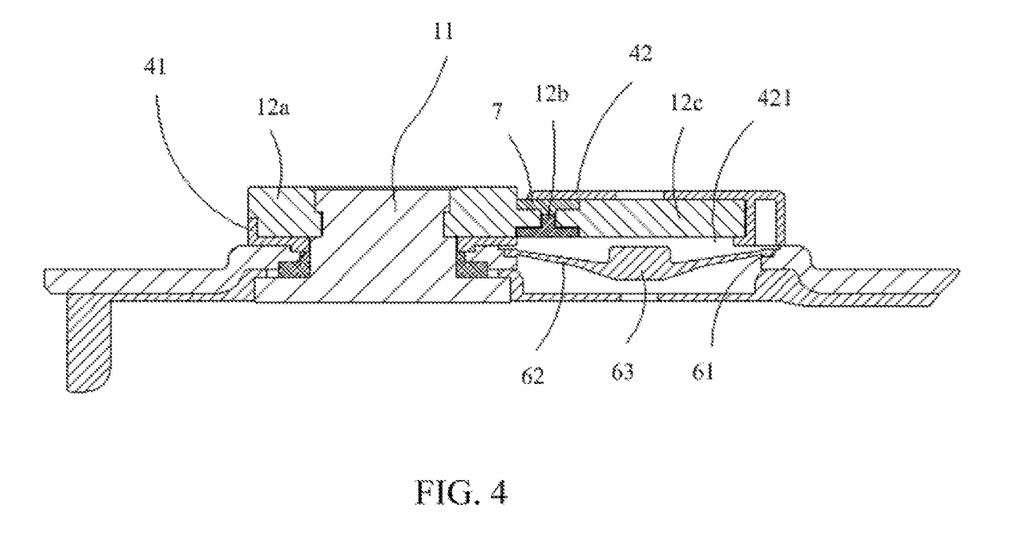
FIG. 4 is an enlarged view of portion A in FIG. 3.

As shown in FIGS. 3-4, the top cover plate 14 is electrically connected to the second electrode terminal 13. The top cover plate 14 is respectively insulated from the first electrode terminal 11 and the conduction member 12. For example, the top cover assembly 1 further includes an insulation member 4 and a sealing member 5. The insulation member 4 includes a first portion 41 and a second portion 42, the first portion 41 is tightly clamped and fixed between the top cover plate 14 and the conduction member 12, the riveting portion 11a of the first electrode terminal 11 extends through the first portion 41 and beyond the external side of the top cover plate 14, and the second portion 42 surrounds a peripheral edge of the contact plate connection portion 12c and a peripheral edge of the first fuse member 12b. The sealing portion 5 is sleeved on an outside of a lower portion of the riveting portion 11a and is in contact with the insulation member 4. The insulating portion 4 achieves insulation between the top cover plate 14 and the first electrode terminal 11. The sealing member 5 realizes the top cover plate 14 and the first electrode terminal 11 are sealed.

The riveting portion 11a of the second electrode terminal 13 is further connected with a second electrode terminal conduction member 15, and the second electrode terminal 13 can be conveniently and electrically connected to external components via the second electrode terminal conduction member 15. A same sealing member as the sealing member 5 on a side of the first electrode terminal 11 is placed on one side of the second electrode terminal 13, so as to achieve sealing at the second electrode terminal 13. A resistor 16 is connected between the second electrode terminal conduction member 15 and the top cover plate 14, to reduce the current in the circuit. When a conductor penetrates through the housing 3 and causes a short circuit in the secondary battery, the resistor 16 can reduce the short-circuit current, reduce the probability of accidents such as fire. The resistor 16 is set based on the secondary battery safety considerations.

Further referring to FIGS. 2-4, the secondary battery further includes a contact plate 6 attached to the top cover plate 14. A hole 141 is defined in the top cover plate 14. When the internal pressure of the secondary battery exceeds a reference pressure, the contact plate 6 deforms under the effect of internal pressure so that the deformed contact plate 6 can contact the contact plate connection portion 12c through the hole 141. At this time, the first electrode terminal 11 and the second electrode terminal 13 are electrically connected to each other, and the short circuit state of the secondary battery is maintained.

A through hole 421 is defined in a part of the second portion 42 directly facing the contact plate 6 so that the deformed contact plate 6 contacts the contact plate connection portion 12c through the through hole 421.

The contact plate 6 includes an edge portion 61, a deformable portion 62 and a central portion 63. The deformable portion 62 connects the edge portion 61 and the central portion 63, and the edge portion 61 is attached to the top cover plate 14. After the contact plate 6 deforms, the central portion 63 contacts the contact plate connection portion 12c and the deformable portion 62 is bent to protrude along a direction away from the top cover plate 14.

Different portions of the contact plate 6 may have different thicknesses, and the portion having a different thicknesses from the other portions may be a protrusion of a portion of the contact plate 6 contacting with the contact plate connection portion 12c, or the thickness of the contact plate 6 may gradually change from a peripheral area toward a central area of the contact plate 6, and the thickness of the central area is greatest so that the contact piece 6 can contact the contact plate connection portion 12c when the contact plate 6 deforms.

The first fuse member 12b can fuse at a predetermined temperature, and a melting point of the first fuse member 12b is lower than the electrode terminal connection portion 12a and the contact plate connection portion 12c. In order to ensure the reliability of the connection between the first fuse member 12b and the electrode terminal connection portion 12a and between the first fuse member 12b and the contact plate connection portion 12c, the conduction member 12 further includes a connection layer (not shown in the drawings) which may be provided on at least one of the electrode terminal connection portion 12a and the contact plate connection portion 12c, so that the first fuse member can function in the hot box test. Correspondingly, the first fuse member 12b may be connected to the electrode terminal connection portion 12a via the connection layer, or be connected to the contact plate connection portion 12c via the connection layer. Or a connection layer may be respectively arranged on the electrode terminal connection portion 12a and the contact plate connection portion 12c, and the first fuse member 12b is respectively connected to the electrode terminal connection portion 12a and the contact plate connection portion 12c via the connection layer.

In the above description, the connection layer may serve to increase the connection strength of the first fuse member 12b with the electrode terminal connection portion 12a and the contact plate connection portion 12c. On the one hand, in the hot-box test, a current can be reliably transmitted among the electrode terminal connection portion 12a, the first fuse member 12b, and the contact plate connection portion 12c. When the temperature increases due to the heat generated by the current and reaches a value at which the first fuse member 12b fuses, the first fuse member 12b reliably fuses. On the other hand, under normal temperature conditions, when the secondary battery is in an overcharged state, the contact plate deforms under an effect of the internal pressure to be electrically connected to the contact plate connecting portion. The arrangement of the connection layer can reduce the contact resistance between the first fuse member 12b and the electrode terminal connection portion 12a and between the first fuse member 12b and the contact plate connection portion 12c, so that the first fuse member 12b will not fuse because of heat generated due to an excessive resistance, thereby improving the safety of the secondary battery.

According to one embodiment, at least one of the electrode terminal connection portion 12a and the contact plate connection portion 12c is made of a first metal material, the first fuse member 12b is made of a second metal material, and the connection layer is made of a third metal material. In order to increase the connection strength, it may be set that a bonding force between the third metal material and the first metal material and the bonding force between the third metal material and the second metal material are both greater than the bonding force between the first metal material and the second metal material. Different metal materials have different bonding abilities during cold bonding or thermal bonding. In this solution, the connection layer is set by using the inherent properties of the metal material so that the first fuse member 12b is respectively bonded firmly to the electrode terminal connection portion 12a and the contact plate connection portion 12c, so as to improve the reliability of connection between the first fuse member 12b and the conduction member 12.

Optionally, the third metal material may be nickel, nickel alloy, tin, tin alloy, bismuth, or bismuth alloy, etc. The first metal material may be aluminum or aluminum alloy. The second metal material may be selected from a group combinations of bismuth, tin, lead, zinc, indium, and combinations thereof. The above-mentioned metal material has good weldability, and during welding, the above-mentioned metal materials have higher degree of bonding and a better bonding firmness.

The first metal material, the second metal material, and the third metal material are not limited to those described above, and in other embodiments, the first metal material, the second metal material, and the third metal material may have other different options.

It should be noted that the connection layer may be a solid component, or as a plating layer formed on a solid component, which is not limited in the present application. In an embodiment, the connection layer may be formed by plating. In this case, the number of the connection layer may be two, one of which is plated on the electrode terminal connection portion 12a and the other is plated on the first fuse member 12b, and the two connection layers are bonded by welding. The connection layer formed by plating can reduce the occupancy of the space and is beneficial to the structural compactness of the top cover assembly 1. Meanwhile, such a plating method can reduce connection of other manners, thereby reducing the risk of connection failure.

In one embodiment, the top cover assembly 1 further includes a thermo-expandable portion 7 made of an insulative and thermally expandable material. As shown in FIG. 4, the first fuse member 12b and the thermo-expandable portion 7 are placed along a thickness direction of the conduction member 12. The thermo-expandable portion 7 is located above the first fusing member 12b, and the thermo-expandable portion 7 is respectively laminated onto the electrode terminal connection portion 12a and the contact plate connection portion 12c. When heated, the thermo-expandable portion 7 expands and deforms, and the contact plate connection portion 12c is displaced away from the electrode terminal connection portion 12a under the expansion force of the thermo-expandable portion 7. At this time, a gap is formed between the electrode terminal connection portion 12a and the contact plate connection portion 12c, and the gap may provide a flow path for the fused first fuse member 12b so that the melted first fuse member 12b flows out along the flow path, thereby achieving the reliable disconnection of the electric connection circuit between the electrode terminal connection portion 12a and the contact plate connection portion 12c.

The thermo-expandable portion 7 may be made of a plastic material, and the thermo-expandable portion 7 and the insulation member 4 may be further integrated into an integral structure. Or, the thermal expansion portion 7 may be separately made of a plastic material.

The present application further provides a secondary battery, which includes the top cover assembly 1 of a secondary battery as described in any embodiment above, an electrode assembly 2 and a housing 3. The top cover assembly 1 is connected to the opening of the housing 3 and forms a packaging space, and the electrode assembly 2 is packaged in the packaging space.

The electrode assembly 2 includes a first electrode, a second electrode, and a separator placed between the first electrode and the second electrode. The flange portion 11b of the first electrode terminal 11 is electrically connected to the first electrode. The flange portion 11b of the second electrode terminal 13 is electrically connected to the second electrode.

The electrode assembly 2 is formed by helically winding the first electrode together with the second electrode having an opposite polarity to the first electrode and the separator. The separator is an insulator interposed between the first electrode and the second electrode. Or, the electrode assembly 2 may be formed by stacking a plurality of first electrodes, a plurality of separators, and a plurality of second electrodes, and the first electrodes, separators and second electrodes are shaped like a plate or a sheet.

The first electrode can be a negative electrode, and the second electrode is a positive electrode. Or the first electrode can be a positive electrode, and the second electrode is a negative electrode.

The first electrode and the second electrode each have a thin plate serving as a current collector. The thin plate of the first electrode includes a first coating portion coated with an active material and a first electrode tab uncoated with any active material. The thin plate of the second electrode includes a second coated portion coated with an active material and a second electrode tab uncoated with any active material.

The housing 3 is formed to have a substantially cubic shape to form a cavity for accommodating the electrode assembly 2 therein, and an opening is formed at a side of the housing 3.

In order to avoid fire caused by overcharging, the secondary battery further includes a second fuse member 101. The second fuse member 101 is connected between the first electrode terminal 11 and the first electrode. The second fuse member 101 may be made of a material having a low melting point or the second fuse member 101 may have relatively a small flow area so that the second fuse member 101 can quickly fuse under a great current, thereby effectively avoiding overcharging.

Similarly, the secondary battery may further includes a third fuse member 102 connected between the second electrode terminal 13 and the second electrode, and the third fuse member 102 has the same function as the second fuse member 101, which is not repeated herein.

In addition, a first insulation member 104 and a second insulation member 105 are further placed between the top cover plate 14 and the electrode assembly 2. The first insulation member 104 is used to insulate the top cover plate 14 from the first electrode tab, and the second insulation member 105 is used to insulate the top cover plate 14 from the second electrode tab.

An air hole 104a is defined in the first insulation member 104. The gas decomposed from the electrode assembly exerts a pressure to the contact plate 6 through the air hole 104a to deform the contact plate 6.

The secondary battery further includes an explosion-proof valve 106, a protection patch 107 used for protecting the explosion-proof valve 106, a liquid injection hole 108, and a sealing element used for sealing the liquid injection hole 108, etc. The explosion-proof valve 106 is configured to be turned on when the internal pressure of the secondary battery reaches a predetermined pressure which may be higher than a threshold pressure under which the contact plate 6 begins to deform.

The foregoing descriptions are merely embodiments of the present application and are not intended to limit the present application. For those skilled in the art, the present application may have various modifications and changes. Any amendments, equivalent substitution and improvement made within the principle of the present application should be included in the protection scope of the present application.

What is claimed is:

1. A top cover assembly of a secondary battery, comprising:
    a first electrode terminal, a conduction member, a second electrode terminal, and a top cover plate,
    wherein the top cover plate is insulated from the first electrode terminal, and the top cover plate is electrically connected to the second electrode terminal,
    wherein the secondary battery further comprises a contact plate, and the contact plate is attached to the top cover plate, and the conduction member is insulated from the top cover plate,
    wherein the conduction member comprises an electrode terminal connection portion, a first fuse member, and a contact plate connection portion, wherein the electrode terminal connection portion is electrically connected to the first electrode terminal, the first fuse member is electrically connected between the electrode terminal connection portion and the contact plate connection portion, and a melting point of the first fuse member is lower than a melting point of the electrode terminal connection portion and a melting point of the contact plate connection portion,
    wherein the contact plate is configured to deform under an internal pressure of the secondary battery and to be electrically connected to the contact plate connection portion when the internal pressure of the secondary battery exceeds a reference pressure, for forming an electric connection path passing through the first electrode terminal and the second electrode terminal, and
    wherein the conduction member further comprises a connection layer, wherein the first fuse member is electrically connected to the electrode terminal connection portion via the connection layer, and the connection layer is configured to enhance a connection strength between the first fuse and the electrode terminal connection portion; and/or the first fuse member is electrically connected to the contact plate connection portion via the connection layer, and the connection layer is configured to enhance a connection strength between the first fuse and the contact plate connection portion.

2. The top cover assembly according to claim 1, wherein the electrode terminal connection portion and/or the contact plate connection portion is made of a first metal material, the first fuse member is made of a second metal material, and the connection layer is made of a third metal material,
    wherein a bonding force formed between the third metal material and the first metal material and a bonding force formed between the third metal material and the second metal material are both greater than a bonding force formed between the first metal material and the second metal material.

3. The top cover assembly according to claim 2, wherein the third metal material is nickel, nickel alloy, tin, tin alloy, bismuth, or bismuth alloy, the first metal material is aluminum or aluminum alloy, the second metal material is a metal comprising one or more elements selected from a group consisting of bismuth, tin, lead, zinc, and indium.

4. The top cover assembly according to claim 1, wherein a number of the connection layer is two, wherein one of the two connection layers is connected to the electrode terminal connection portion, the other one of the two connection layers is connected to the first fuse member, and the two connection layers are welded to each other.

5. The top cover assembly according to claim 1, further comprising an insulation member, wherein the conduction member is insulated from the top cover plate by the insulation member, and
wherein a first through hole is defined in the insulation member, and the contact plate deformed contacts the contact plate connection portion through the first through hole.

6. The top cover assembly according to claim 5, wherein the insulation member comprises a first portion and a second portion connected to the first portion, wherein the first portion is fixed between the electrode terminal connection portion and the top cover plate, and the second portion surrounds the contact plate connection portion,
wherein the first through hole is defined in the second portion.

7. The top cover assembly according to claim 1, further comprising a thermo-expandable portion made of an insulative and thermally expandable material,
wherein the first fuse member and the thermo-expandable portion are arranged along a thickness direction of the conduction member, the thermo-expandable portion is located above the first fusing portion, and the thermo-expandable portion is respectively laminated to the electrode terminal connection portion and the contact plate connection portion.

8. The top cover assembly according to claim 7, further comprising an insulation member, wherein the conduction member is insulated from the top cover plate via the insulation member, and the insulation member and the thermo-expandable portion are formed as an integral structure.

9. A secondary battery comprising the top cover assembly according to claim 1, a housing and an electrode assembly, wherein the top cover assembly is connected to an opening of the housing and forms a packaging space,
wherein the electrode assembly comprises a first electrode, a second electrode, and a separator interposed between the first electrode and the second electrode, wherein the first electrode terminal is electrically connected to the first electrode, and the second electrode terminal is electrically connected to the second electrode; and
wherein the electrode assembly is packaged in the packaging space.

10. The secondary battery according to claim 9, wherein the secondary battery further comprises a second fuse member, and the first electrode terminal is electrically connected to the first electrode via the second fuse member, and/or
the secondary battery further comprises a third fuse member, and the second electrode terminal is electrically connected to the second electrode via the third fuse member.

11. The secondary battery according to claim 9, wherein the electrode terminal connection portion and/or the contact plate connection portion is made of a first metal material, the first fuse member is made of a second metal material, and the connection layer is made of a third metal material,
wherein a bonding force formed between the third metal material and the first metal material and a bonding force formed between the third metal material and the second metal material are both greater than a bonding force formed between the first metal material and the second metal material.

12. The secondary battery according to claim 11, wherein the third metal material is nickel, nickel alloy, tin, tin alloy, bismuth, or bismuth alloy, the first metal material is aluminum or aluminum alloy, the second metal material is a metal comprising one or more elements selected from a group consisting of bismuth, tin, lead, zinc, and indium.

13. The secondary battery according to claim 9, wherein a number of the connection layer is two, wherein one of the two connection layers is connected to the electrode terminal connection portion, the other one of the two connection layers is connected to the first fuse member, and the two connection layers are welded to each other.

14. The secondary battery according to claim 9, wherein the top cover assembly further comprises an insulation member, wherein the conduction member is insulated from the top cover plate by the insulation member, and
wherein a first through hole is defined in the insulation member, and the contact plate deformed contacts the contact plate connection portion through the first through hole.

15. The secondary battery according to claim 14, wherein the insulation member comprises a first portion and a second portion connected to the first portion, wherein the first portion is fixed between the electrode terminal connection portion and the top cover plate, and the second portion surrounds the contact plate connection portion,
wherein the first through hole is defined in the second portion.

16. The secondary battery according to claim 9, wherein the top cover assembly further comprises a thermo-expandable portion made of an insulative and thermally expandable material,
wherein the first fuse member and the thermo-expandable portion are arranged along a thickness direction of the conduction member, the thermo-expandable portion is located above the first fusing portion, and the thermo-expandable portion is respectively laminated to the electrode terminal connection portion and the contact plate connection portion.

17. The secondary battery according to claim 16, wherein the top cover assembly further comprises an insulation member, wherein the conduction member is insulated from the top cover plate via the insulation member, and the insulation member and the thermo-expandable portion are formed as an integral structure.

* * * * *